US012368577B2

(12) United States Patent
Li et al.

(10) Patent No.: US 12,368,577 B2
(45) Date of Patent: Jul. 22, 2025

(54) METHOD FOR MANAGING A DIGITAL IDENTITY SYSTEM

(71) Applicant: LSC Ecosystem Corporation, New Taipei (TW)

(72) Inventors: Wei-Ming Li, New Taipei (TW); Kuan-Hsun Cho, Kaohsiung (TW); Sung-Ching Lin, New Taipei (TW)

(73) Assignee: LSC Ecosystem Corporation, New Taipei (TW)

( * ) Notice: Subject to any disclaimer, the term of this patent is extended or adjusted under 35 U.S.C. 154(b) by 215 days.

(21) Appl. No.: 18/368,022

(22) Filed: Sep. 14, 2023

(65) Prior Publication Data

US 2024/0089090 A1   Mar. 14, 2024

Related U.S. Application Data

(60) Provisional application No. 63/406,257, filed on Sep. 14, 2022.

(51) Int. Cl.
*H04L 9/32*   (2006.01)
*H04L 9/00*   (2022.01)
*H04L 9/08*   (2006.01)

(52) U.S. Cl.
CPC .......... *H04L 9/0825* (2013.01); *H04L 9/3236* (2013.01); *H04L 9/50* (2022.05)

(58) Field of Classification Search
CPC ........ H04L 9/0825; H04L 9/50; H04L 9/0861
See application file for complete search history.

(56) References Cited

U.S. PATENT DOCUMENTS

| 11,716,312 B1* | 8/2023 | McNamara, Jr. ....... G06F 21/46 726/6 |
| 11,973,889 B2* | 4/2024 | Han ........................ H04L 9/008 |
| 2020/0175590 A1* | 6/2020 | Huo .......................... H04L 9/50 |

* cited by examiner

*Primary Examiner* — Lynn D Feild
*Assistant Examiner* — Vladimir I Gavrilenko
(74) *Attorney, Agent, or Firm* — Winston Hsu

(57) ABSTRACT

A method for managing a digital identity system includes generating a user digital identity for a user, generating an asset digital identity for an asset, generating a user public key and a user private key after the user digital identity is generated, generating descriptive data related to the asset, generating a data public key and a data private key after the descriptive data is generated, encrypting the data with the data public key to generate encrypted data, saving the data private key on a user end, uploading the encrypted data to a cloud database, a platform reading the encrypted data from the cloud database, a data requester querying and requesting for data, forwarding a data request to a data owner in an qualified data owner set and granting a data access to the data request if the data owner accepts the data request.

8 Claims, 3 Drawing Sheets

METHOD FOR MANAGING A DIGITAL IDENTITY SYSTEM

CROSS REFERENCE TO RELATED APPLICATIONS

This application claims the benefit of U.S. Provisional Application No. 63/406,257, filed on Sep. 14, 2022. The content of the application is incorporated herein by reference.

BACKGROUND OF THE INVENTION

1. Field of the Invention

A method for managing a digital identity system, especially a method for managing a digital identity system using block chain is proposed in this invention.

2. Description of the Prior Art

The Internet of Things (IoT) refers to the collective network of connected devices and the technologies that help them communicate with the cloud and with each other. Thanks to the advance of cheap computing chips and high-bandwidth wireless communications, billions of devices are connected to the internet today. This means that devices such as toothbrushes, vacuum cleaners, cars and various machines can use sensors to collect data and intelligently respond to user needs.

The Internet of Things (IoT) integrates things with the Internet. Computer engineers have been adding sensors and processors to objects since the 1990s. But because the chips are big and bulky, this approach was not popular at first. Low-power computing chips known as radio frequency identification (RFID) tags were first used to track expensive equipment. As technology advances, computing devices shrink in size, and these chips become smaller, faster, and smarter.

The cost of giving computing power to small items has now been greatly reduced. For example, voice service can be added to an MCU with less than 1 MB embedded RAM and can be used for a light switch. A whole new industry has emerged with the goal of filling our homes, businesses and offices with IoT devices. These smart objects can automatically transmit data to or obtain data from the Internet. These "invisible computing devices" and related technologies are collectively known as the Internet of Things.

A typical IoT system collects and exchanges data over time. An IoT system contains three parts: smart devices, IoT applications, and a graphical user interface (GUI).

Smart devices have computing capabilities, for example, televisions, surveillance cameras, or sports equipment can all be smart devices. These devices collect data from the surrounding environment, user input or usage patterns, and exchange this data through the network and IoT applications.

An IoT application is an umbrella term for services and software used to integrate data from various IoT devices. These applications use machine learning or artificial intelligence (AI) techniques to analyze the data and make smart decisions. The decisions made will be sent back to the IoT device, so that the IoT network device can respond to the user's needs more intelligently.

IoT devices or clusters can be managed using a graphical user interface (GUI). Common examples include mobile applications or websites that can register and control smart devices.

However, when numerous applications and data using smart devices are uploaded to the cloud database. The security and identification of data and smart devices are needed. A lack of encryption and identity may lead to misappropriation and crime using the cloud database and smart devices.

SUMMARY OF THE INVENTION

A method for managing a digital identity system includes generating a user digital identity for a user upon receiving a registration of the user, generating an asset digital identity for an asset upon receiving a registration of the asset, generating a user public key and a user private key after the user digital identity is generated, generating descriptive data related to the asset, generating a data public key and a data private key after the descriptive data is generated, encrypting the data with the data public key to generate encrypted data, saving the data private key on a user end, uploading the encrypted data to a cloud database, a platform reading the encrypted data from the cloud database, a data requester querying and requesting for data, forwarding a data request to a data owner in an qualified data owner set and granting a data access to the data request if the data owner accepts the data request.

These and other objectives of the present invention will no doubt become obvious to those of ordinary skill in the art after reading the following detailed description of the preferred embodiment that is illustrated in the various figures and drawings.

DETAILED DESCRIPTION

In the generation of internet of things (IoT), everything can be searched and defined in the internet. Through the internet, objects are all described and saved in the cloud as data. In this manner, the relationship between data owners with digital identity and assets with digital identity should be defined in a platform. Therefore, a method for managing a digital identity system is needed and proposed.

Figure 1:
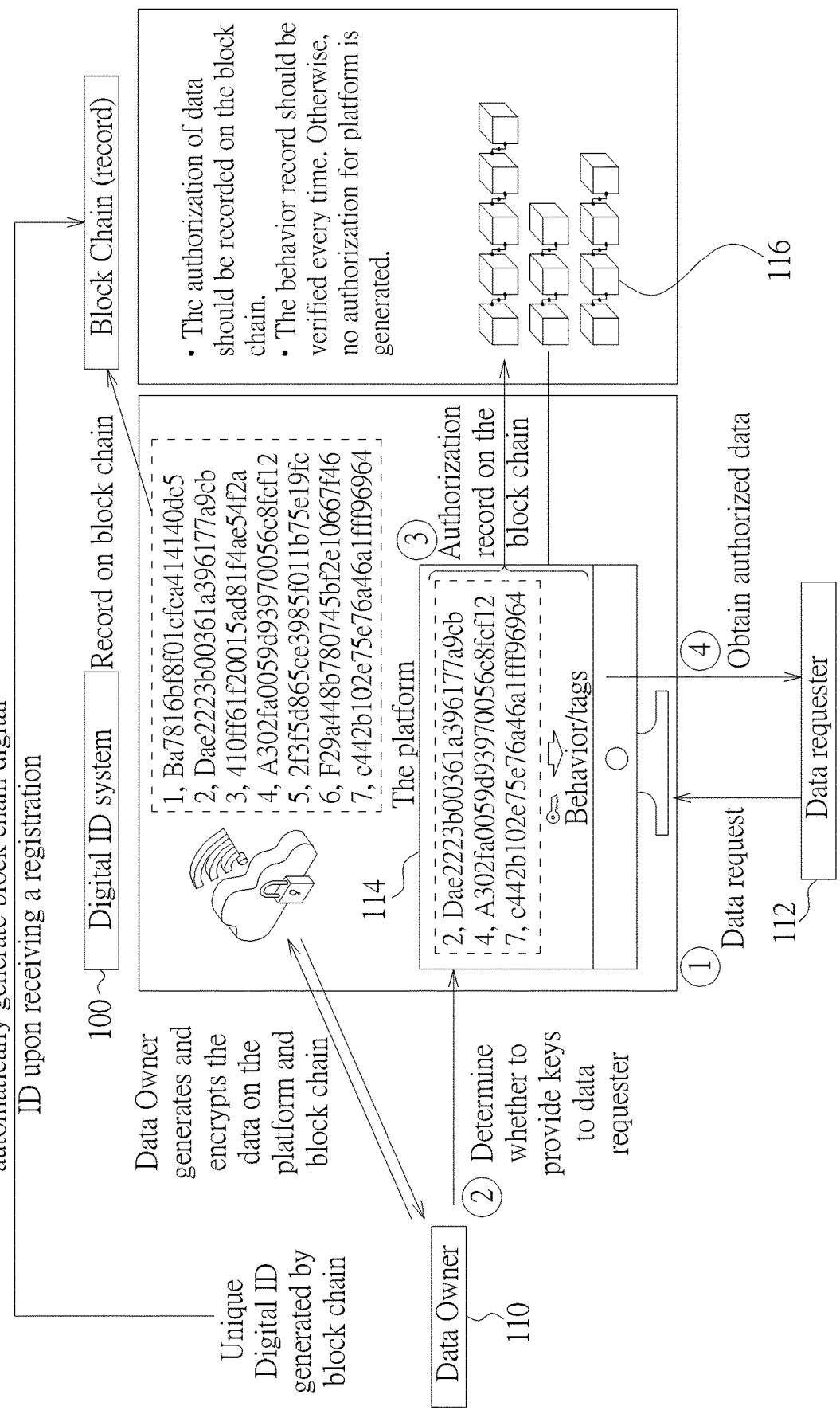
FIG. 1 is an architecture of a digital identity system with block chain and a platform according to an embodiment of the present invention.

FIG. 1 is an architecture of a digital identity system 100 with a block chain 116 and a platform 114 according to an embodiment of the present invention. Initially a data requester 112 queries and sends a data request to the platform 114. Then, the platform 114 asks the data owner 110 whether to provide keys to data requester 112. If the data owner 110 rejects the request from the platform 114, then the authorization fails. If the data owner 110 accepts the request from the platform 114, the data owner 110 provides the user public key and the data private key to the platform 114, and the authorization is recorded on the block chain 116. At last, the authorized data can be downloaded from the platform 114 to the data requester 112.

Figure 2:
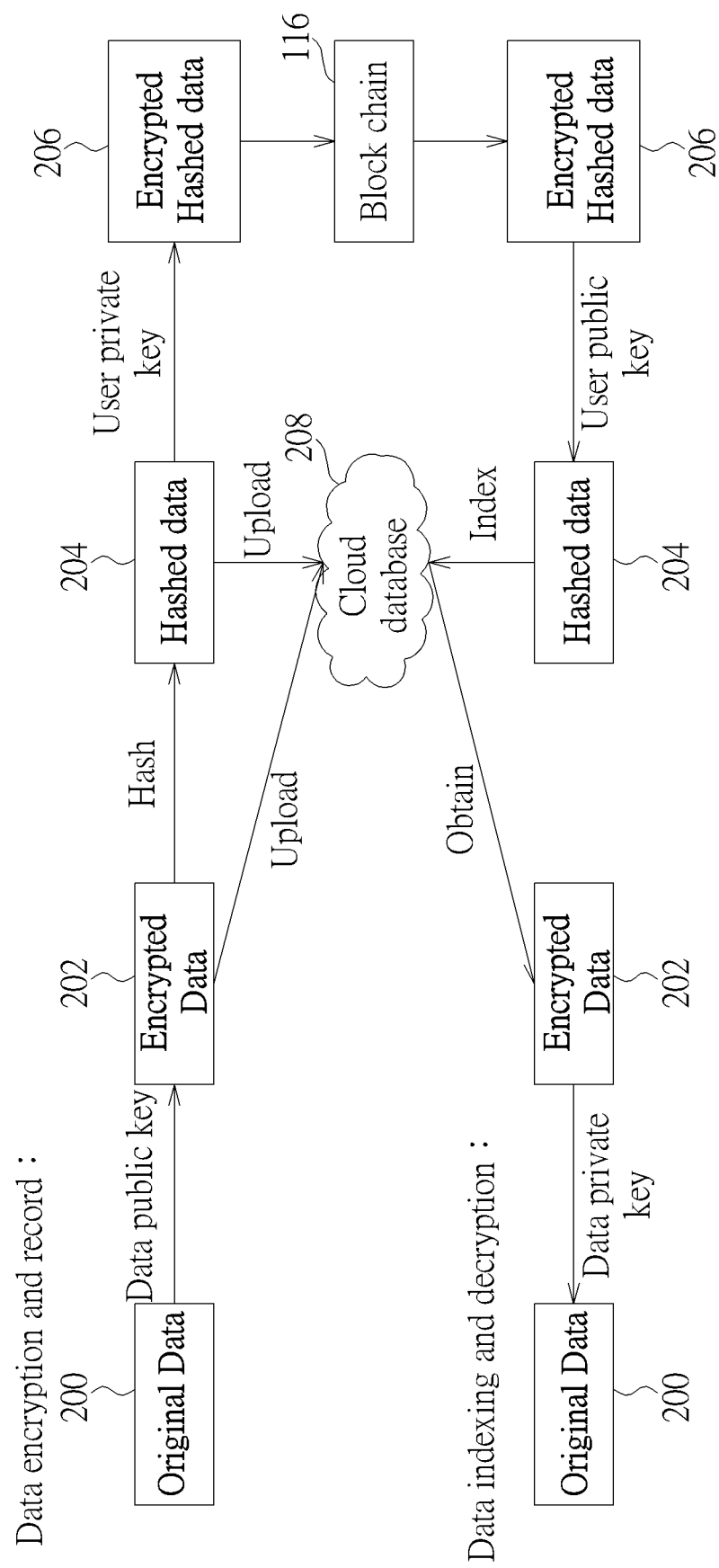
FIG. 2 shows a flow of encrypting and decrypting data according to an embodiment of the present invention.

FIG. 2 shows a flow of encrypting and decrypting data according to an embodiment of the present invention. The original data 200 is encrypted with the data public key to generate the encrypted data 202, and the encrypted data 202 is uploaded to the cloud database 208. Then, the encrypted data 202 is hashed to generate the hashed data 204, and the hashed data 204 is uploaded to the cloud database 208. The hashed data 204 is encrypted with the user private key to generate the encrypted hashed data 206 on the block chain 116. After that, the encrypted hashed data 206 is decrypted with the user public key to generate the hashed data 204, and the hashed data 204 is indexed in the cloud database to obtain the encrypted data 202. At last, the encrypted data is decrypted with the data private key to obtain the original data 200, and the unique download link can be provided to the data requester 112.

At first, a user digital identity is generated for a user upon receiving a registration of the user. A user public key and a user private key are generated after the user digital identity is generated. Secondly, an asset identity is generated for an asset upon receiving a registration of the asset. Third, a descriptive data related to the asset is generated such as a name of the asset, a generation date of the descriptive data, and a field description of the descriptive data. Then, a data public key and a data private key are generated after the descriptive data is generated. The platform 114 encrypts the data 200 with the data public key to generate encrypted data 202. Furthermore, the platform 114 hashes the encrypted data 202 to generate hashed data 204, and uploads the hashed data 204 to a cloud database 208. The data private key is saved on a user end, and the hashed data 204 is encrypted with the user private key at the user end to generate encrypted hash data 206. The encrypted hash data 206 is recorded on a block chain. The platform 114 reads the encrypted data 202 and the hashed data 204 from the cloud database 208. The data requester 112 queries and requests for data, and the platform 114 forwards the data request to a data owner 110 in a qualified data owner set. The platform 114 grants a data access to the data request if the data owner 110 accepts the data request. After the data access is granted, the data owner 110 provides the user public key and the data private key to the platform 114. After the platform 114 receives the user public key, the digital identity system 100 decrypts the encrypted hash data 206 to generate the hashed data 204 on the block chain 116. If the hashed data 204 is not generated by decrypting the encrypted hash data 206, the digital identity system 100 returns a failed signal to the platform 114 and presenting the failed signal to the data requester 112 and the data owner 110.

Then, the platform 114 uses the hashed data 204 to index the encrypted data 202 in the cloud database 208. If the indexing is not successful, the digital identity system 100 returns a failed signal to the platform 114 and presents the failed signal to the data requester 112 and the data owner 110. If the indexing is successful, the digital identity system 100 returns a success signal to the platform 114 and presents the success signal to the data requester 112 and the data owner 110. The platform 114 obtains and decrypts the encrypted data 202 with the data private key from the cloud database 208 to provide a unique download link to the data requester 112. The unique download link is a one-time download link and is available in a limited time period.

Figure 3:
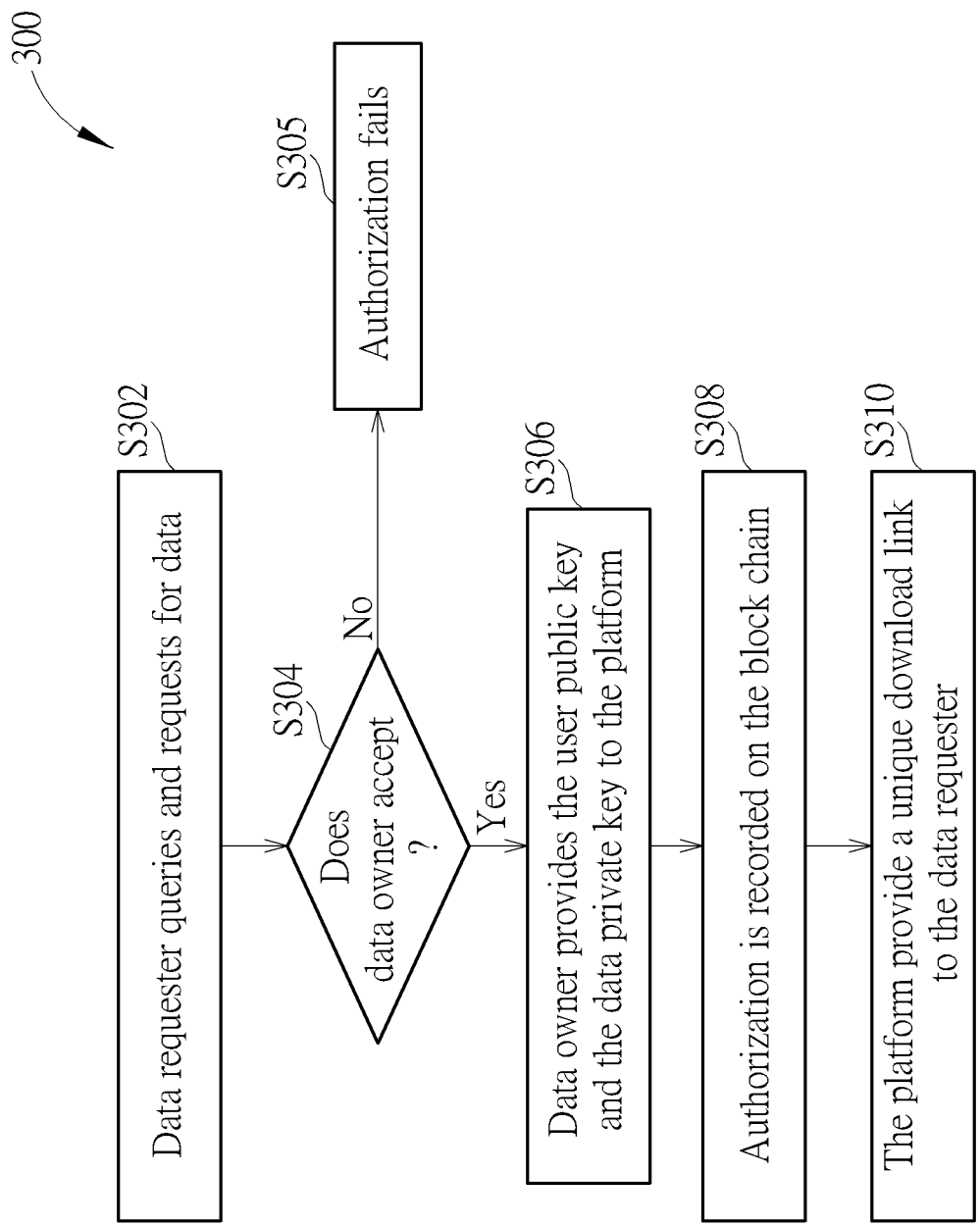
FIG. 3 is a flowchart of the method for managing a digital identity system according to an embodiment of the present invention.

FIG. 3 is a flowchart 300 of a method for managing the digital identity system 100 according to an embodiment of the present invention.

Step S302: The data requester 112 queries and requests for data;

Step S304: Does the data owner 110 accept the data request? If so, go to Step S306; else go to Step S305;

Step S305: Authorization fails.

Step S306: The data owner 110 provides the user public key and the data private key to the platform 114;

Step S308: The authorization is recorded on the block chain 116;

Step S310: The platform 114 provides a unique download link to the data requester 112.

In Step S304, if the data owner 110 rejects the data request, then in Step S305, the authorization fails and the user public key and the data private key will not be provided. If the data owner 110 accepts the data request, then in Step S306, the user public key is used to decrypt the encrypted hash data 206, and the data private key is used to decrypt the encrypted data 202. If the decryption fails, the digital identity system 100 sends a failed signal to the platform 114 and presents to the data owner 110 and the data requester 112. In Step S308, all authorization and encryption of data are recorded on the block chain 116, and the recorded behavior should be verified every time.

Compared to the prior art, the security and identification for the data of the asset and the user in the cloud database are achieved in the embodiment. Encryption on the block chain enhances the safety of the data, and the digital identity system enhances the identification of the data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a digital identity system comprising:
   generating a user digital identity for a user upon receiving a registration of the user;
   generating an asset digital identity for an asset upon receiving a registration of the asset;
   generating a user public key and a user private key after the user digital identity is generated;
   generating descriptive data related to the asset;
   generating a data public key and a data private key after the descriptive data is generated;
   encrypting the data with the data public key to generate encrypted data;
   saving the data private key on a user end;
   uploading the encrypted data to a cloud database;
   a platform reading the encrypted data from the cloud database;
   a data requester querying and requesting for data;
   forwarding a data request to a data owner in a qualified data owner set;
   granting a data access to the data request when the data owner accepts the data request;
   hashing the encrypted data to generate hashed data;
   uploading the hashed data to the cloud database;
   encrypting the hashed data with the user private key at the user end to generate encrypted hash data;
   recording the encrypted hash data on a block chain;
   after the data access is granted, the data owner providing the user public key and the data private key to the platform;
   after the platform receives the user public key, decrypting the encrypted hash data to generate the hashed data on the block chain; and
   using the hashed data to index the encrypted data in the cloud database.

2. The method of claim 1, further comprising when the encrypted data is not indexed successfully, returning a failed signal to the platform and presenting the failed signal to the data requester and the data owner.

3. The method of claim 1, further comprising when the encrypted data is indexed successfully, returning a success signal to the platform and presenting the success signal to the data requester and the data owner.

4. The method of claim 3, further comprising the platform obtaining the encrypted data from the cloud database.

5. The method of claim 4, further comprising:
using the data private key to decrypt the encrypted data; and
providing a unique download link to the data requester.

6. The method of claim 5, wherein the unique download link is a one-time download link and is available in a limited time period.

7. The method of claim 1, further comprising:
after the platform receives the user public key, decrypting the encrypted hash data; and
when the hashed data is not generated by decrypting the encrypted hash data, returning a failed signal to the platform and presenting the failed signal to the data requester and the data owner.

8. The method of claim 1, wherein the descriptive data comprises a name of the asset, a generation date of the descriptive data, and a field description of the descriptive data.

* * * * *